United States Patent [19]
Rudolf

[11] Patent Number: 4,483,194
[45] Date of Patent: Nov. 20, 1984

[54] ACCELEROMETER

[75] Inventor: Felix Rudolf, Cortaillod, Switzerland

[73] Assignee: Centre Electronique Horloger S.A., Switzerland

[21] Appl. No.: 391,672

[22] Filed: Jun. 24, 1982

[30] Foreign Application Priority Data

Jul. 2, 1981 [CH] Switzerland ............... 4361/81

[51] Int. Cl.$^3$ .......................................... G01P 15/125
[52] U.S. Cl. ................................. 73/517 R; 73/517 B
[58] Field of Search ............ 73/516 R, 517 R, 517 B; 357/25

[56] References Cited

U.S. PATENT DOCUMENTS

| | | | |
|---|---|---|---|
| 3,209,601 | 10/1965 | Stiles ................................. | 73/517 B |
| 3,691,850 | 9/1972 | Slater et al. ...................... | 73/516 R |
| 3,877,313 | 4/1975 | Ferriss ............................... | 73/517 B |
| 4,244,225 | 1/1981 | Greenwood ..................... | 73/517 AV |
| 4,342,227 | 8/1982 | Petersen et al. ................. | 73/517 R |
| 4,345,474 | 8/1982 | Deval ................................ | 73/517 B |

OTHER PUBLICATIONS

"A Monolithic Capacitive Pressure Sensor with Pulse-Period Output", IEEE Transactions on Electron Devices, vol. ED-27, No. 5, May 1980.
"An Electrochemical P-N Junction Etch-Stop for the Formation of Silicon Microstructure" Which Appeared in IEEE Electron Device Letters, vol. EDL-9, No. 2, Feb. 1981.
"Silicon Cantilever Beam Accelerometer Utilizing a PI-FET Capacitive Transducer", IEEE Trans. on Electron Devices, vol. ED-26, No. 11, Nov. 1979.
"A Batch-Fabricated Silicon Accelerometer", IEEE Trans. on Electron Devices, vol. ED-26, No. 12, Dec. 1979.
"Micromechanical Accelerometer Integrated with MOS Detection Circuitry" by Petersen et al., from International Electron Devices Meeting Technical Digest, Dec. 1980.
"A Miniature Integrated Circuit Accelerometer" by Roylance et al. IEEE International Solid-State Circuits Conference Feb. 1978.

Primary Examiner—James J. Gill
Attorney, Agent, or Firm—Parkhurst & Oliff

[57] ABSTRACT

Integrated accelerometers comprising a flap (2) fixed to a carrier (1) by two attachment means (3) which are disposed symmetrically and in line with one side of the flap. An electrode (5) deposited on a plate (4) permits acceleration to be measured by measuring the corresponding variation in capacitance between the flap (2) and the electrode (5).

12 Claims, 5 Drawing Figures

ACCELEROMETER

The present invention relates to devices for measuring acceleration in general and more particularly concerns an accelerometer which is suitable for production by means of integrated electronic circuit technology.

Accelerometers are already known, which are produced using methods similar to those for producing integrated circuits. Among such accelerometers, mention may be made of those described in the following articles: "Silicon Cantilever Beam Accelerometer Utilizing a PI-FET Capacitive Transducer" which appeared in IEEE Trans. on Electron Devices, Volume ED-26, No. 11, November 1979; and "A Batch-Fabricated Silicon Accelerometer", which appeared in IEEE Trans. on Electron Devices, Volume ED-26, No. 12, December 1979. Another integrated accelerometer was presented to the International Electron Devices Meeting which was held in Washington on 8th, 9th and 10th Dec. 1980, under the title "Micromechanical Accelerometer Integrated With MOS Detection Circuitry". Such accelerometers basically comprise a rectangular membrane, one side of which is fixed to a carrier, and means for detecting the movement of the membrane under the effect of acceleration. Such a metod of fixing the membrane involves a relatively substantial value in regard to the spring constant of the accelerometer, and that runs counter to achieving a high degree of sensitivity. Moreover, such devices are also responsive to acceleration effects in undesired directions.

Thus, an object of the present invention is an accelerometer which is suitable for production using technology employed for electronic integrated circuits, and which does not suffer from the above-indicated disadvantages.

Another object of the invention is an accelerometer which has a high degree of sensitivity to acceleration effects in a privileged direction.

Another object of the invention is an accelerometer which is virtually insensitive to acceleration effects in directions different from the privileged direction.

In accordance with a feature of the invention, the accelerometer comprises:

a flap which is fixed to a carrier by two opposed resilient attachment means and which is capable of turning about its attachment means under the effect of acceleration perpendicular to the plane of said carrier;

at least one electrode disposed facing said flap and in a plane parallel to the plane of said carrier; and means for producing, on the basis of measurement of the capacitance between said flap and said electrode, a signal representing the acceleration to which said flap is subjected.

In accordance with another feature of the invention, there are provided two electrodes which are disposed on respective sides of said flap and negative feedback means for applying between said flap and one of said two electrodes a voltage capable of compensating for the effect of the acceleration to which said flap is subjected and returning the flap to its rest position.

The use of two symmetrical attachment means which operate in a torsion mode makes it possible to achieve a low value in respect of the spring constant, thereby enhancing the sensitivity of the accelerometer. In addition, arranging the attachment means on respective sides of the flap ensures that the flap is sufficiently held in position, while opposing any movement thereof other than a rotary movement about the axis of the attachment means.

Other objects, features and advantages of the present invention will be more clearly apparent from the following description of particular embodiments, the description being given purely by way of illustration and with reference to the accompanying drawings in which.

Figure 1:
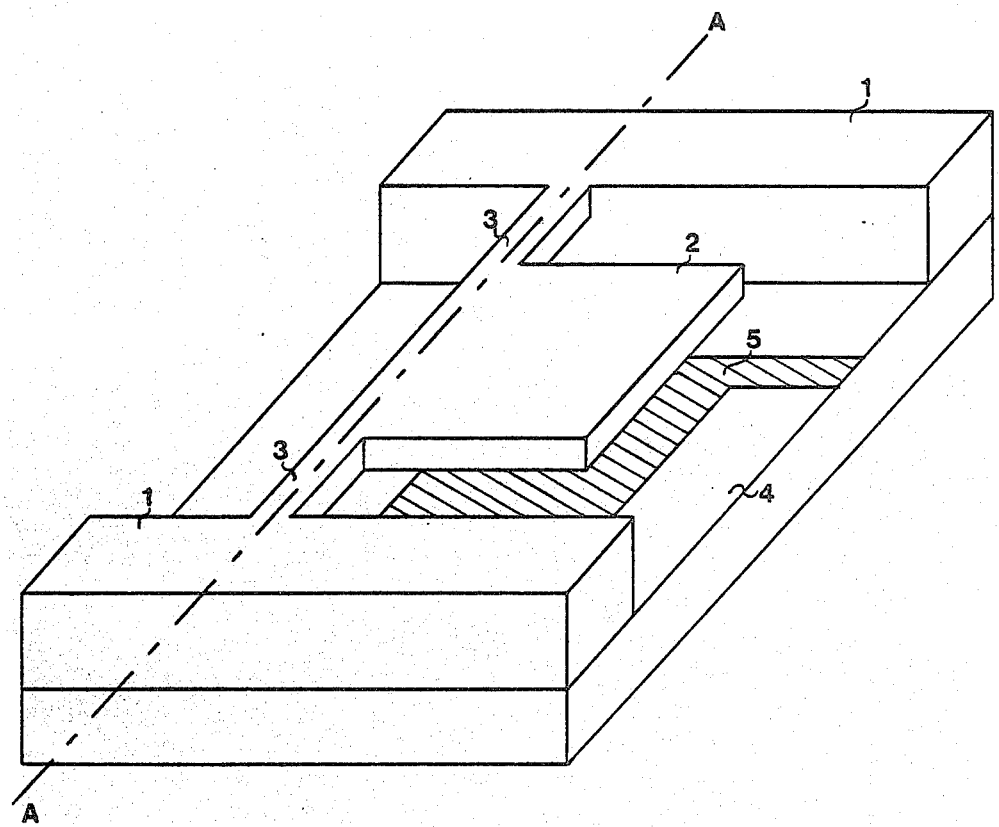
FIG. 1 is a diagrammatic view of a flap structure and the attachment means thereof, in accordance with the principles of the present invention.

FIG. 1 shows a diagrammatic view of a device in accordance with the principles of the present invention. The essential component of this device is a flap or vane 2 which is held to a carrier 1 by two resilient attachment means 3. The carrier 1 is disposed on a plate 4 on which an electrode 5 is deposited. Such a device may be produced by means of technology similar to that used in integrated electronic circuits. By way of example, the carrier 1 will be made of a silicon substrate of the n type, the flap 2 and the attachment means 3 thereof will be cut out in the substrate and doped with a p-type doping substance, and the plate 4 on which an aluminum electrode will have been deposited will comprise glass.

The device operates in the following manner:

The flap 2 forms both an inertia mass and a capacitor plate, the other plate of the capacitor being the electrode 5. When the device is subjected to acceleration perpendicular to the plane of the plate 4, the flap turns about its resilient attachment means 3 until the return torque applied by the attachment means 3 balances the moment produced on the flap by the acceleration. The angle through which the flap has turned is then proportional to the acceleration. The rotary movement of the flap produces a corresponding variation in the capacitance between the flap and the electrode 5, which it is possible to measure.

The structure of the flap makes it possible to have a highly favorable ratio between the inertia force and the return force. In fact, the return force may be reduced by a reduction in the cross-section of the attachment means, with the flap still being properly supported. The reduction in the return force of the attachment means increases the sensitivity of the device and enhances its frequency response. Another advantage of such a structure is that, if it enhances the rotary movement of the flap about its attachment means, in contrast it opposes any other movement which would involve an increase in the length of the attachment means. That ensures good performance from the device with regard to measuring acceleration in a privileged direction, namely the direction perpendicular to the plane of the carrier. That advantage is further enhanced if the carrier 1 comprises monocrystalline silicon and if the flap and the attachment means thereof are heavily doped with boron, a typical concentration being equal to or greater than $10^{19}$ atoms/cm$^3$. The consequence of doping with boron is to give rise to longitudinal stresses on the flap attachment means, which makes the flap more rigid in relation to movements other than the privileged movement.

Figure 2:
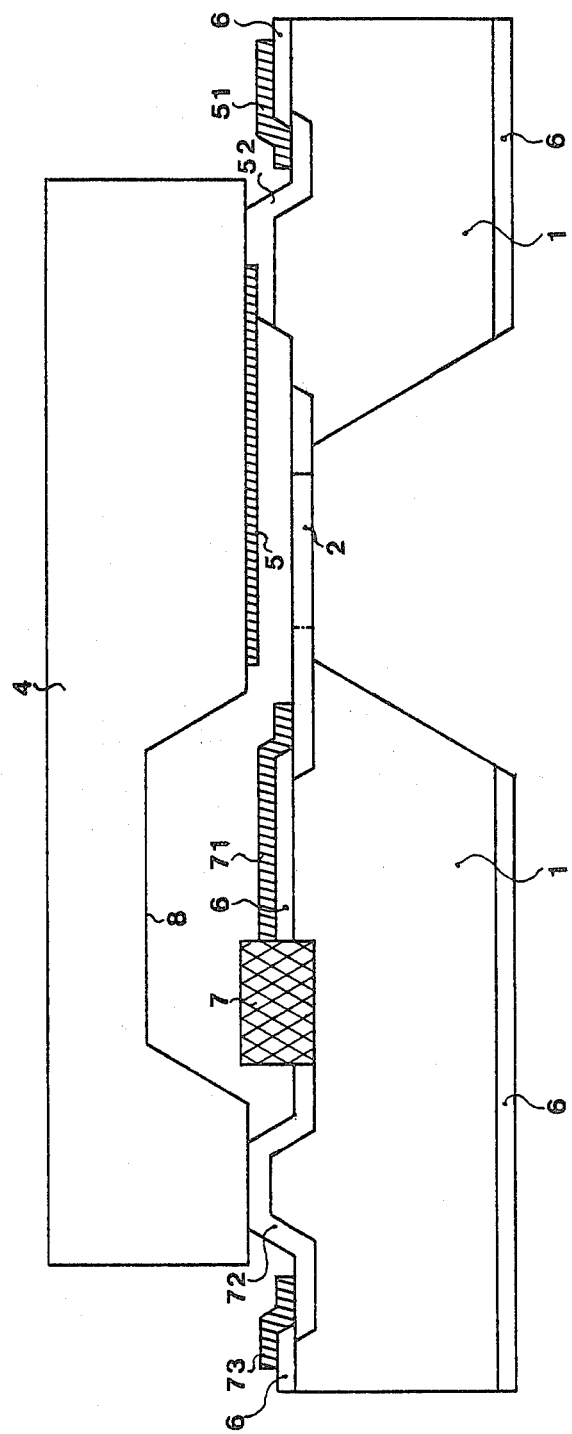
FIG. 2 shows a first alternative embodiment of the accelerometer according to the invention.

FIG. 2 shows a cross-sectional view of an embodiment of an accelerometer according to the invention. The section is taken along the axis of rotation of the vane or flap, for example the axis A—A in FIG. 1. Components which are similar to those shown in FIG. 1 are denoted by the same reference numerals. Thus, FIG. 2 once again shows the carrier 1, the flap 2 and the attachment means thereof, the electrode 5, and the plate 4. FIG. 2 also shows a block 7 which represents the measuring circuit associated with the accelerometer and which is preferably integrated on the same carrier 1, and connections. Such connections, which are made for example of aluminum, are provided to connect the flap to the measuring circuit 7 by means of the connection 71 and the electrode 5 to a contact area 51, by way of a $p^+$ diffusion region 52, or to the measuring circuit 7 by way of the region 52, the area 51, the area 73 and the $p^+$ diffusion region 72. The carrier 1 is made in a substrate of silicon of type $n^-$. On its lower surface, it is protected by an insulating layer 6 of $SiO_2$. A $SiO_2$ insulating layer is also provided on the top surface, to insulate the connections from the carrier. The plate 4 may be made of glass which is in part metallized by deposit of aluminum, to form the electrode 5, and is fixed to the carrier 1 using the anodic bonding method. A recess 8 is provided in the plate 4, facing the measuring circuit 7.

The description of a process for producing a structure comparable to that shown in FIG. 2 can be found in the article "A Monolithic Capacitive Pressure Sensor With Pulse-Period Output" which appeared in the review IEEE Transactions on Electron Devices, Volume ED-27, No. 5, May 1980. Additionally, the article "An Electrochemical P-N Junction Etch-Stop for the Formation of Silicon Microstructures" which appeared in IEEE Electron Devices Letter, Volume EDL-2, N.2, February 1981, describes a process for producing a membrane of the claimed thickness. After producing the membrane the flap 2 and the attachment means thereof are then cut out by etching, preferably in a gaseous medium, i.e., by plasma or ion etching, for example.

Figure 3:
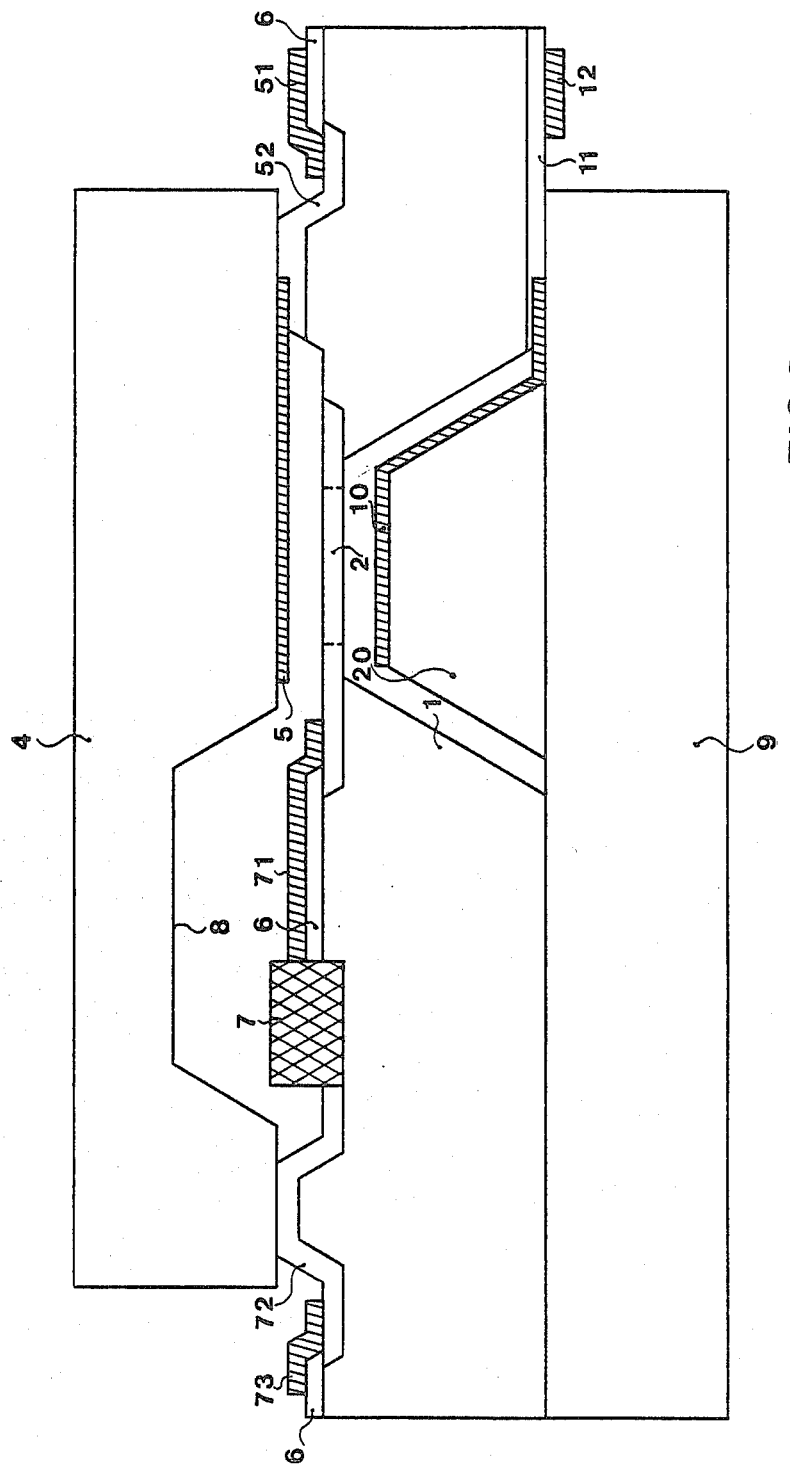
FIG. 3 shows a second alternative embodiment of the accelerometer according to the invention.

FIG. 3 shows an alternative embodiment of the device shown in FIG. 1, wherein an additional electrode 10 is provided opposite the electrode 5 with respect to the flap 2. The additional electrode 10 is produced by depositing aluminum on a silicon base 20 which is fixed to a glass plate 9. The silicon is first fixed to the plate 9 using the anodic bonding process, and then the silicon is etched to produce the base 20 and the electrode 10 is then deposited thereon. The assembly formed by the plate 9, the base 20 and the electrode 10 is then fixed to the carrier 1 by anodic bonding. The additional electrode 10 is connected to a contact area 12 by way of a $p^+$-doped region 11. The electrode 10 serves as a negative feedback member, as will be more clearly apparent from the description of FIG. 5.

Figure 4:
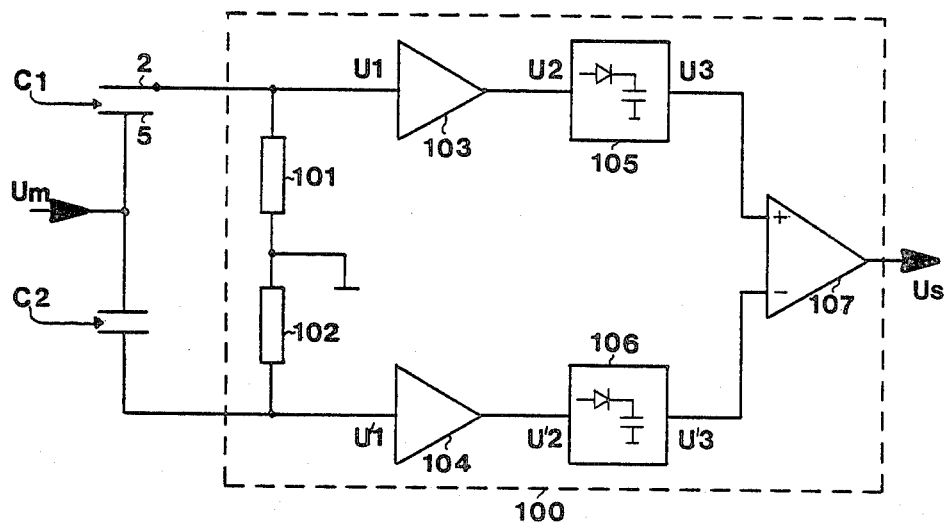
FIG. 4 is a block diagram of a measuring circuit associated with the accelerometer of FIG. 2.

FIG. 4 is a block diagram of an acceleration measuring circuit associated with the device according to the invention. The flap 2 and the electrode 5 form a variable capacitor C1 which is part of a measuring bridge comprising a capacitor C2 and two resistors 101 and 102, the common point of which is connected to ground. The point which is common to the capacitor C1 and the resistor 101 is connected to the input of an amplifier 103. Once the output signal of the amplifier 103 has been rectified and filtered by the circuit 105, it is applied to an input of a differential amplifier 107. The point which is common to the capacitor C2 and the resistor 102 is connected to the input of an amplifier 104, and the output signal of the amplifier 104, once rectified and filtered by the circuit 106, is applied to the other input of the differential amplifier 107. The point which is common to the two capacitors C1 and C2 receives a high-frequency signal Um. Rotary movement of the flap 2 under the effect of acceleration causes corresponding amplitude and phase modulation of the signal U1. The difference in amplitude between the signals U1 and U'1 is extracted by means of the circuits 103 to 107 to give a signal Us which is representative of the acceleration to which the flap 2 is subjected. It will be appreciated that FIG. 4 is given only by way of example. In fact, it is possible to measure the phase difference introduced, as between the signals U1 and U'1, by means of the variation in capacitance of C1, to produce a signal which represents that variation and consequently the acceleration being measured.

Figure 5:
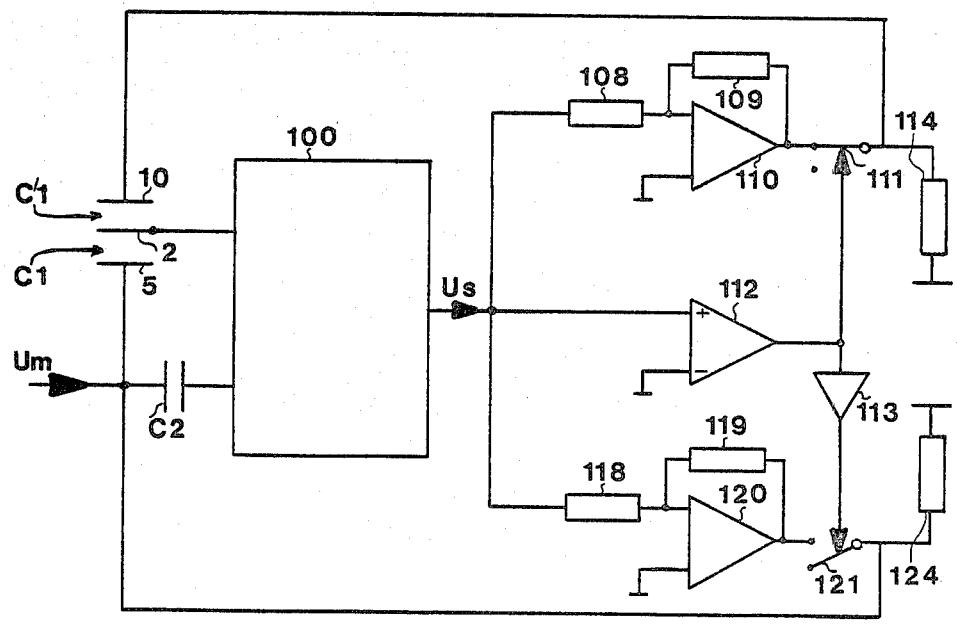
FIG. 5 is a block diagram of a measuring circuit associated with the accelerometer of FIG. 3.

FIG. 5 shows the block diagram of a measuring circuit incorporating a negative feedback loop. Thus, FIG. 5 again shows the variable capacitor C1, the capacitor C2 and the measuring circuit 100 of FIG. 4, which produces the signal Us representing the variation in capacitance of C1. Another capacitor C'1 is formed by the flap 2 and the additional electrode 10 (see FIG. 3). The signal Us is applied to two amplifier assemblies represented by an operational amplifier 110 and two resistors 108 and 109 on the one hand, and an operational amplifier 120 and two resistors 118 and 119 on the other hand. The polarity of the signal Us is detected by a comparator 112, the output of which controls the switches 111 and 121. The circuit 113 indicates that the switches 111 and 121 are always in opposite states. The switches 111 and 121 permit a voltage which is proportional to the signal Us to be applied either to the electrode 10 or to the electrode 5 in order to move the flap 2 into a position close to its equilibrium position. The gain of the amplifier assemblies must be adjusted to compensate for the differences in capacitance as between C1 and C'1. Two resistors 114 and 124 permanently connect the electrode 10 and the electrode 5 respectively to ground. The value of the resistors 114 and 124 must be higher than the impedance of the capacitors C1 and C'1.

The possibility of including a negative feedback loop affords the advantage of increasing the measuring range of the accelerometer, and also makes it possible to reduce the distance between the flap and the electrode, since the rotary movement of the flap is limited by the negative feedback.

Although the present invention has been described within the framework of particular embodiments, it will be clear that it is in no way limited by such embodiments and that it may be the subject of modifications and alterations without thereby departing from the scope thereof. In particular, it is clear that other semiconductor materials such as germanium or insulating materials such as sapphire may be used to form the carrier. However, if the carrier is an insulating carrier, the flap and the attachment means thereof are made of a conductive material.

What is claimed is:

1. An integrated semiconductor accelerometer comprising:
   a semiconductor carrier substrate defining a plane;
   a semiconductor flap member
   only two resilient attachment means coupled to said substrate in opposed and coaxial relationship for mounting said flap for rotation about only one axis, said attachment means providing rotation of said flap member about said one axis in response to an acceleration perpendicular to said plane and causing a return torque to be applied to said flap member, said substrate, said flap member and said attachment means being formed of a single thin piece of monocrystalline silicon with said flap and said attachment means being heavily doped with boron creating longitudinal stresses on the flap attachment means which thus rigidly resist movements of the flap member other than movements about said one axis, at least one electrode disposed facing said flap member in a plane parallel to the plane defined by said substrate; and means for producing a signal which is a function of the distance between said flap member and said electrode and represents acceleration to which said flap member is subjected.

2. The accelerometer of claim 1, wherein said signal is produced as a function of the capacitance between said flap member and said electrode.

3. The accelerometer of claim 1 comprising two electrodes disposed on respective sides of said flap member and negative feedback means for applying between said flap member and one of said two electrodes a signal for compensating for the effect of the acceleration to which said flap member is subjected, and for returning said flap member to its rest position.

4. The accelerometer of any one of claims 1, 2 or 3, wherein said substrate, said flap member and said attachment means thereof comprise silicon and the flap member and attachment means thereof include semiconductive doping of a different type from said substrate.

5. The accelerometer of claim 1, wherein said means for producing a signal representing the acceleration are integrated on said substrate.

6. The accelerometer of claim 5, wherein said means for producing a signal representing the acceleration comprises a measuring bridge including at least one fixed capacitor and the variable capacitor formed by the flap member and said electrode.

7. The accelerometer of claim 6, wherein said means for producing a signal representing the acceleration further comprises measuring circuitry connected to said measuring bridge, for extracting the difference in amplitudes between two signals, one of said two signals being a reference signal and the other of said two signals representing said reference signal which has been modulated proportionally to the rotary movement of said flap member.

8. The accelerometer of claim 7 comprising two electrodes disposed on respective sides of said flap member, and said measuring circuitry incorporating negative feedback means for applying between said flap member and one of said two electrodes a signal for compensating for the effect of the acceleration to which said flap member is subjected and for returning said flap to its rest position.

9. The accelerometer of claim 3 or 8, wherein the signal for compensating is a voltage.

10. The accelerometer of claim 1, wherein said electrode is deposited on a plate which is fixed on said substrate.

11. The accelerometer of claim 1 wherein said signal is produced as a function of the capacitance between said flap member and said electrode.

12. The accelerometer of claim 1 wherein said at least one electrode comprises two electrodes disposed on respective sides of said flap member and further including negative feedback means for applying a signal between said flap member and one of said two electrodes for compensating for the effect of the acceleration to which said flap member is subjected and for returning said flap member to its rest position.

* * * * *